United States Patent [19]

Roffler

[11] 4,160,477

[45] Jul. 10, 1979

[54] SPACER GRID FOR PARALLEL CYLINDRICAL TUBES

[75] Inventor: Josua Roffler, Raterschen, Switzerland

[73] Assignee: Sulzer Brothers, Ltd., Winterthur, Switzerland

[21] Appl. No.: 828,423

[22] Filed: Aug. 29, 1977

[30] Foreign Application Priority Data

Sep. 6, 1976 [CH] Switzerland .................. 11279/76

[51] Int. Cl.² .............................................. F28F 9/00
[52] U.S. Cl. .................................. 165/172; 165/162; 176/78; 248/68 R
[58] Field of Search ................ 165/162, 172, 178; 176/78; 122/510; 248/68 R, 68 CB

[56] References Cited

U.S. PATENT DOCUMENTS

| | | | |
|---|---|---|---|
| 3,301,764 | 1/1967 | Timbs et al. | 176/78 |
| 3,646,994 | 3/1972 | Piepers et al. | 165/162 |
| 3,664,924 | 5/1972 | Krawiec | 176/78 |
| 3,715,275 | 2/1973 | Krawiec | 176/78 |
| 4,007,899 | 2/1977 | Piepers et al. | 165/162 |

*Primary Examiner*—Sheldon Jay Richter
*Attorney, Agent, or Firm*—Kenyon & Kenyon

[57] ABSTRACT

The spacer grid is formed of metal strips which are bent to have alternating long angular sides and short flat sides. The strips are secured to each other at alternating flat sides to form a series of hexagonal spaces to receive the heat exchanger tubes. In addition, pairs of spring tabs are bent out of each of the angular sides in alternating manner to effect support of the tube in a space. The angular sides form an included angle of 135° with the flat sides.

9 Claims, 7 Drawing Figures

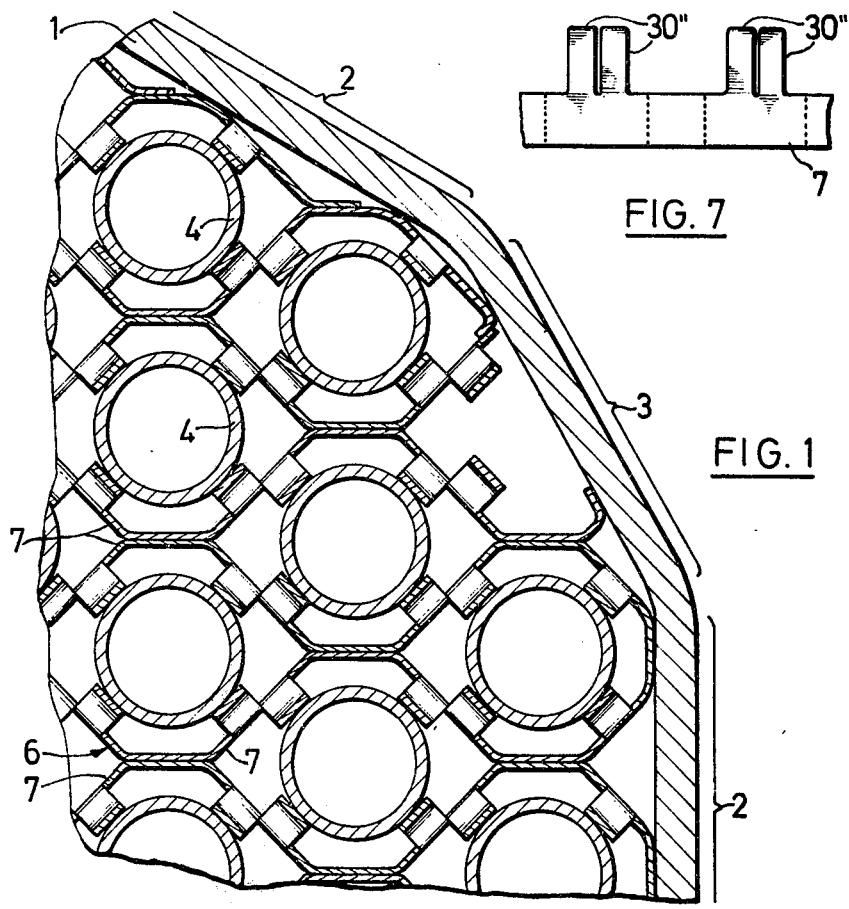
FIG. 7
FIG. 1
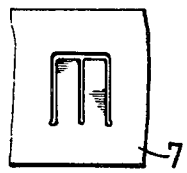
FIG. 3
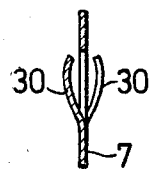
FIG. 4
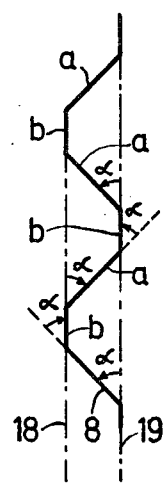
FIG. 2
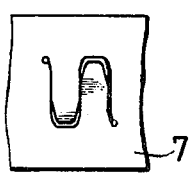
FIG. 5
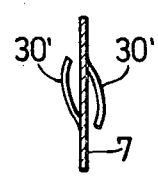
FIG. 6

SPACER GRID FOR PARALLEL CYLINDRICAL TUBES

This invention relates to a spacer grid and more particularly to a spacer grid for a plurality of parallel cylindrical elements such as heat exchanger tubes.

Heretofore, spacer grids have been known for maintaining a spacing between mutually parallel cylindrical heat transfer elements which are arranged in a regular triangular grid pattern. As described in U.S. Pat. No. 3,439,737, one such grid is formed of a plurality of multiple-bent metal strips which are joined together to form a grid with hexagonal spaces between the strips. In addition, the strips have been provided with bent-out projections in order to support the cylindrical elements within the hexagonal spaces. As described, the metal strips are bent in a manner so as to form regular hexagonal spaces with sides that are of equal length. The bent-out projections are made in the form of creases or beads which are disposed on every second side of the hexagon so that every cylindrical element is supported at three points about the circumference. This spacer grid, however, forms a relatively rigid mounting and requires very accurate fabrication as well as large forces for inserting the cylindrical elements into the grid.

Accordingly, it is an object of this invention to provide a spacer grid which does not require very accurate fabrication.

It is another object of the invention to provide a spacer grid which provides a relatively soft mounting.

It is another object of the invention to provide a spacer grid into which cylindrical elements or tubes can be easily inserted.

It is another object of the invention to provide a spacer grid for heat exchanger tubes which has relatively good damping characteristics.

Briefly, the invention provides a spacer grid which is comprised of at least two metal strips wherein each strip is of corrugated shape to define alternating long angular sides and short flat sides. The strips are secured together at alternating flat sides in order to form a series of hexagonal spaces therebetween. In addition, each strip has a pair of spring tabs bent out of each of the angular sides in alternating manner to project into an adjacent hexagonal space.

The spacer grid is particularly used with a plurality of parallel heat exchanger tubes or elements which are disposed in a regular triangular grid with constant pitch. In this case, the grid serves to space the tubes from each other with each tube being disposed in a respective hexagonal space and with the spring tabs effecting support of each tube at four points.

The construction of the grid is such that each two long angular sides enclose an angle of 90°. Thus, each heat exchanger tube is supported at four points about the circumference of the tube by the spring tabs. These spring tabs provide a relatively soft mounting as compared to the previously known creased bent-out projections. Further, by supporting each tube by four spring tabs, smaller support forces can be utilized. Also, because of the smaller support forces, the damping effect provided by the grid is effective at smaller vibrations. Still further, the heat exchanger tubes can be more easily inserted into the spacer grid during assembly.

The invention thus provides a spacer grid which requires less material than previously known spacer grids. Further, the stresses in the metal of the grid are lower as the strips are bent at angles of 45° between the long and short sides instead of 60° as in previously known structures. In addition, a lower pressure loss for a medium flowing around the heat exchanger tubes is obtained as less material is required for the grid. Still further, fabrication of the grid is simpler as the sides of the metal strips which are secured to each other do not require any spring tabs.

These and other objects and advantages of the invention will become more apparent from the following detailed description taken in conjunction with the accompanying drawings in which:

FIG. 1 illustrates a partial cross-sectional view of a spacer grid supporting a plurality of heat exchanger tubes in accordance with the invention;

FIG. 2 illustrates a scheme for bending the metal strips of the spacer grid in accordance with the invention;

FIG. 3 illustrates a view of a side of a metal strip having a pair of spring tabs formed therein in accordance with the invention;

FIG. 4 illustrates a side view of the side of the grid of FIG. 3;

FIG. 5 illustrates an alternative modification of the manner of forming a pair of spring tabs in a side of a spacer grid;

FIG. 6 illustrates a side view of the side of the spacer grid of FIG. 5; and

FIG. 7 illustrates a further embodiment of a manner of forming spring tabs on a metal strip of a spacer grid in accordance with the invention.

Referring to FIG. 1, a sheet metal tube 1 of basically hexagonal cross section is formed with six sides 2 of relatively long length. The six corners of the tube 1 are broken so that each pair of adjacent long sides 2 are connected to each other by a short side 3. For purposes of simplicity, only one corner of the sheet metal tube 1 is illustrated.

A plurality of parallel heat exchanger tubes 4 are disposed in the tube 1 in a regular triangular grid with constant pitch. In addition, a plurality of spacer grids 6 are disposed within the tube 1 in order to keep the heat exchanger tubes 4 spaced from each other. These grids 6 are arranged in parallel with each other and are distributed over the length of the tube 1.

Each spacer grid 6 consists of several metal strips 7 each of which is bent into a corrugated shape to define alternating long angular sides a (see FIG. 2) and short flat sides b. As shown in FIG. 2, each of the angular sides a forms an angle $\alpha$ of 45°, or an included angle of 135° with an adjacent flat sides b. As also indicated in FIG. 2, bending begins with the long section 8 and repeats such that the flat sides b are parallel with alternating flat sides in a common plane 18, 19.

As shown in FIG. 1, the strips 7 are secured together at alternating flat sides b to form a series of hexagonal spaces therebetween. Securement may be effected by spot welding of the flat sides b together. Each grid 6 thus assumes a honeycomblike configuration with the angular sides of two neighboring strips defining an angle of 90°.

Each long side a of a metal strip 7 has a pair of spring tabs 30 which are bent out in alternating manner to project into an adjacent hexagonal space. These tabs 30 can be formed by punching and are bent in a slight S-shape to rest tangentially under a slight bias against the heat exchanger tubes 4 which extend through the hexagonal spaces.

Referring to FIGS. 3 and 4, each pair of spring tabs 30 can be formed in the metal strip by three equidistant cuts which define the long sides of the tabs and a common cut which defines the small sides of the tabs. As shown in FIG. 3, the four cuts produce a E with tines pointing downwardly as viewed.

Alternatively, referring to FIGS. 5 and 6, the tabs 30' may be formed in an alternating manner. In this case, the angular sides a of the metal strip 7 each have three equidistant cuts to define the long sides of the tabs 30' and a pair of spaced-apart transverse cuts to define the small side of each tab 30'. These five cuts define a "S", lying on its side as viewed. These tabs 30' allow the metal strips 7 to be stressed in flexure more uniformly.

Referring to FIG. 7, the spring tabs 30' may alternatively project from a long side of a metal strip 7. A grid of such metal strips has less flow resistance but has somewhat less load-carrying capacity in the axial direction of the tubes 4. Such a grid is therefore employed in bundles with a small number of cylindrical elements or tubes.

It may be advantageous to have the same number of tabs 30 act on the same tube 4 in the upward as in the downward direction, preferably in the same plane normal to the tube axis. In this way, the friction forces of the tabs 30 acting in the axial direction cancel each other should the tube 4 start to vibrate transversely.

In order to reduce the notch-effect stresses at the points of transition from the spring tabs 30 to the metal strips 7, sharp corners and ends of the punched cuts are avoided as indicated in FIGS. 3 and 5.

What is claimed is:

1. In combination,
   a plurality of parallel heat exchanger tubes disposed in a regular triangular grid with constant pitch; and
   a grid spacing said tubes from each other, said grid comprising a plurality of bent metal strips, each said strip having alternating angular sides and flat sides and being secured to an adjacent strip at alternating flat sides to form a series of hexagonal spaces therebetween with one of said tubes being disposed in each respective one of said spaces, and a pair of adjacent spring tabs bent out of each of said angular sides in alternating manner to project into an adjacent hexagonal space to effect support of a respective tube therein.

2. The combination as set forth in claim 1 wherein said strips are spot welded together at said alternating flat sides.

3. The combination as set forth in claim 1 wherein each said angular side of a respective strip forms an angle of 135° with an adjacent flat side.

4. A spacer grid comprising
   at least two metal strips, each said strip being of corrugated shape to define alternating angular sides and flat sides, said strips being secured together at alternating flat sides to form a series of hexagonal spaces therebetween and with angular sides of two neighboring strips defining an angle of 90°; and
   each said strip having a pair of spring tabs bent out of each of said angular sides in alternating manner to project into an adjacent hexagonal space.

5. A spacer grid as set forth in claim 4 wherein each said angular side has three equidistant cuts defining long sides of a pair of said tabs and a common cut defining a small side of each said tab.

6. A spacer grid as set forth in claim 4 wherein each said angular side has three equidistant cuts defining long sides of a pair of said tabs and a pair of spaced-apart transverse cuts each defining a small side of a respective tab.

7. A spacer grid as set forth in claim 4 wherein said strips are spot welded together at said alternating flat sides.

8. A spacer grid as set forth in claim 4 wherein each said angular side of a respective strip forms an angle of 135° with an adjacent flat side.

9. A spacer grid as set forth in claim 8 wherein said flat sides of each strip are parallel with alternating flat sides of each strip in a common plane.